United States Patent
Wang

(10) Patent No.: US 9,550,119 B2
(45) Date of Patent: Jan. 24, 2017

(54) METHOD, APPARATUS, AND SYSTEM FOR WEBGAME INTERACTION

(71) Applicant: TENCENT TECHNOLOGY (SHENZHEN) COMPANY LIMITED, Shenzhen (CN)

(72) Inventor: Dong Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 337 days.

(21) Appl. No.: 14/193,171

(22) Filed: Feb. 28, 2014

(65) Prior Publication Data

US 2014/0295974 A1    Oct. 2, 2014

Related U.S. Application Data

(63) Continuation of application No. PCT/CN2013/088341, filed on Dec. 2, 2013.

(30) Foreign Application Priority Data

Apr. 2, 2013 (CN) .......................... 2013 1 0113126

(51) Int. Cl.
    *A63F 9/24*      (2006.01)
    *A63F 13/34*      (2014.01)

(52) U.S. Cl.
    CPC ........................................ *A63F 13/34* (2014.09)

(58) Field of Classification Search
None
See application file for complete search history.

(56) References Cited

U.S. PATENT DOCUMENTS 8,414,387 B1 * 4/2013 Paradise ............. G07F 17/3225
    463/25
8,616,976 B2 * 12/2013 Kaarela ................... G07F 17/32
    463/42

(Continued)

FOREIGN PATENT DOCUMENTS

CN      1881916 A      12/2006
CN      101470773 A      7/2009

(Continued)

OTHER PUBLICATIONS

The World Intellectual Property Organization (WIPO) International Search Report for PCT/CN2013/088341 Mar. 6, 2014.

(Continued)

*Primary Examiner* — Paul A D'Agostino
(74) *Attorney, Agent, or Firm* — Anova Law Group, PLLC

(57) ABSTRACT

Methods, apparatus, and systems for webgame interactions are provided. A first terminal sends a request for establishing a P2P channel to a second browser, when the first browser logs in to a webgame application on the first terminal. The P2P channel is established between the first browser and the second browser, after the first browser receives an accepting response to the request for establishing the P2P channel from the second browser. The first browser uses the P2P channel to transmit webgame application data between the first browser and the second browser. An exemplary browser can include a requesting module, an establishing module, and a processing module. Another exemplary browser can include a receiving module, an obtaining module, a responding module, an establishing module, and a processing module.

14 Claims, 5 Drawing Sheets

(56) References Cited

U.S. PATENT DOCUMENTS

| | | | | |
|---|---|---|---|---|
| 8,690,682 B1* | 4/2014 | Frattinger | ............... | A63F 13/12 463/16 |
| 2007/0123353 A1* | 5/2007 | Smith | .................... | A63F 13/12 463/42 |
| 2007/0129123 A1* | 6/2007 | Eryou | .................... | A63F 13/12 463/1 |
| 2008/0234043 A1* | 9/2008 | McCaskey | ............. | A63F 13/12 463/29 |
| 2008/0318687 A1* | 12/2008 | Backer | .................... | A63F 13/12 463/42 |
| 2009/0062013 A1* | 3/2009 | Williams | ................ | A63F 13/10 463/42 |
| 2009/0062014 A1* | 3/2009 | Gift | ......................... | A63F 13/10 463/42 |
| 2009/0298582 A1 | 12/2009 | Dempsky et al. | | |
| 2009/0318219 A1* | 12/2009 | Koustas | .................. | G07F 17/32 463/23 |
| 2010/0248842 A1* | 9/2010 | Ruppert | .................. | A63F 13/12 463/42 |
| 2011/0086706 A1* | 4/2011 | Zalewski | ................ | A63F 13/06 463/36 |
| 2012/0015742 A1* | 1/2012 | Vanbragt | ............... | H04W 4/206 463/42 |
| 2012/0196686 A1* | 8/2012 | Karsten | .................. | G07F 17/32 463/42 |
| 2012/0196688 A1* | 8/2012 | Karsten | .................. | G07F 17/32 463/43 |
| 2012/0208636 A1* | 8/2012 | Feige | ..................... | A63F 13/12 463/31 |
| 2012/0264504 A1* | 10/2012 | Gagner | ................. | G07F 17/326 463/25 |
| 2013/0059660 A1* | 3/2013 | Zalewski | ................ | A63F 13/06 463/36 |
| 2013/0165234 A1* | 6/2013 | Hall | ....................... | A63F 13/00 463/42 |
| 2013/0172062 A1* | 7/2013 | Amaitis | .............. | G07F 17/3237 463/13 |
| 2013/0178281 A1* | 7/2013 | Ayyar | .................... | A63F 13/12 463/30 |
| 2013/0252742 A1* | 9/2013 | Shimono | ................. | A63F 13/12 463/43 |
| 2014/0113727 A1* | 4/2014 | Guest | .................... | H04L 67/38 463/42 |

FOREIGN PATENT DOCUMENTS

| | | |
|---|---|---|
| CN | 101674261 A | 3/2010 |
| CN | 102215274 A | 10/2011 |
| CN | 102447688 A | 5/2012 |
| CN | 102932456 A | 2/2013 |

OTHER PUBLICATIONS

The State Intellectual Property Office of the People's Republic of China (SIPO) Office Action 1 for 201310113126.5 Feb. 13, 2015.

* cited by examiner

METHOD, APPARATUS, AND SYSTEM FOR WEBGAME INTERACTION

CROSS-REFERENCES TO RELATED APPLICATIONS

This application is a continuation application of PCT Patent Application No. PCT/CN2013/088341, filed on Dec. 2, 2013, which claims priority to Chinese Patent Application No. 2013101131265, filed on Apr. 2, 2013, the entire contents of all of which are incorporated herein by reference.

FIELD OF THE DISCLOSURE

The disclosure relates to the webgame field and, more particularly, relates to methods, apparatus, and systems for webgame interactions.

BACKGROUND

Webgame is a web browser based, multiplayer interactive, network game. Players do not need to download a client for playing a game, but they can use the web browser to open a webpage to enter a game. Webgame communication is performed between the web and a server. Interactions between players are performed via the server.

Currently, webgames use a communication mode including a B/S (browse/server) mode. This mode uses an application as the core to deploy servers in the network. Requests from the players and communications between players must go through an application server to complete. However, this communication mode has drawbacks. Webgames cannot be directly connected, and players cannot have p2p interaction, and all communications/interactions have to be transited through the server. This requires a high demanding for the server and results in great pressure on the server.

BRIEF SUMMARY OF THE DISCLOSURE

One aspect of the present disclosure includes a webgame interaction method by a first terminal. The first terminal sends a request for establishing a P2P channel to a second browser, when the first browser logs in to a webgame application on the first terminal. The first terminal uses the first browser to access the webgame application, and the first terminal performs the webgame interaction with a second terminal using the second browser to access the webgame application. The P2P channel is established between the first browser and the second browser, after the first browser receives an accepting response to the request for establishing the P2P channel from the second browser. The first browser uses the P2P channel to transmit webgame application data between the first browser and the second browser.

Another aspect of the present disclosure includes a webgame interaction method by a second terminal. The second browser receives a request for establishing a P2P channel sent from a first browser. The second terminal uses the second browser to access a webgame application, and the second terminal performs the webgame interaction with a first terminal using the first browser to access the webgame application. The second browser obtains a configuration of the webgame application and returns an accepting response to the request for establishing the P2P channel to the first browser, when the configuration allows the P2P channel to be established between the second browser and the first browser. The P2P channel is established between the second browser and the first browser. The second browser uses the P2P channel to transmit webgame application data to the first browser.

Another aspect of the present disclosure includes a first browser for a webgame interaction. The first browser can include a requesting module, an establishing module, and a processing module. The requesting module is configured to send a request for establishing a P2P channel to a second browser, when the first browser logs in to a webgame application and to receive an accepting response to the request for establishing the P2P channel from the second browser. A first terminal uses the first browser to access the webgame application, and the first terminal performs the webgame interaction with a second terminal using the second browser to access the webgame application. The establishing module is configured, after the requesting module receives the accepting response to the request for establishing the P2P channel, to establish the P2P channel between the first browser and the second browser. The processing module is configured to use the P2P channel to transmit webgame application data with the second browser.

Another aspect of the present disclosure includes a second browser for a webgame interaction. The second browser includes a receiving module, an obtaining module, a responding module, an establishing module, and a processing module. The receiving module is configured to receive a request for establishing a P2P channel sent from a first browser. A second terminal uses the second browser to access a webgame application, and the second terminal performs the webgame interaction with a first terminal using the first browser to access the webgame application. The obtaining module is configured to obtain a configuration of the webgame application. The responding module is configured, when the configuration allows the P2P channel to be established between the second browser and the first browser, to return an accepting response to the request for establishing the P2P channel to the first browser. The establishing module is configured to establish the P2P channel between the second browser and the first browser, when the configuration allows the P2P channel to be established between the second browser and the first browser. The processing module is configured to use the P2P channel to transmit webgame application data to the first browser.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Methods, apparatus and systems for a webgame interaction are provided, as shown in FIGS. 1-7. The disclosed methods, apparatus and systems can be implemented in an environment and/or using a computer-based system.

Figure 8:
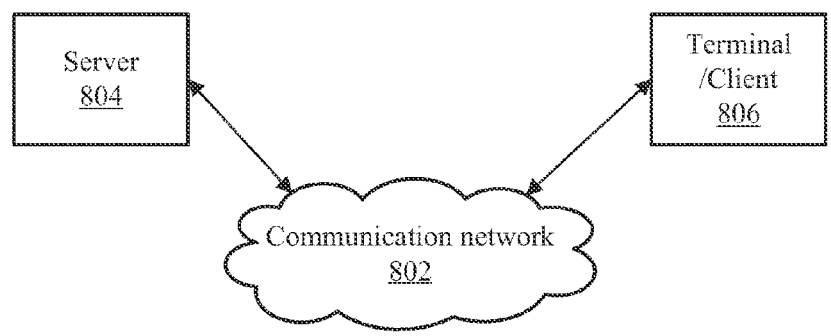
FIG. 8 depicts an exemplary environment incorporating certain disclosed embodiments.

For example, FIG. 8 depicts an exemplary environment 800 incorporating certain disclosed embodiments. As shown in FIG. 8, environment 800 may include a server 804, a terminal or a client 806, and/or a communication network 802. The server 804 and the client 806 may be coupled through the communication network 802 for information exchange, such as obtaining web data. Although only one client 806 and one server 804 are shown in the environment 800, any number of clients 806 or servers 804 may be included, and other devices may also be included.

Communication network 802 may include any appropriate type of communication network for providing network connections to the server 804 and client 806 or among multiple servers 804 or clients 806. For example, communication network 802 may include the Internet or other types of computer networks or telecommunication networks, either wired or wireless.

A terminal, as used herein, may refer to any appropriate user terminal with certain computing capabilities, such as a personal computer (PC), a work station computer, a handheld computing device (tablet), a smart phone or mobile phone, or any other user-side computing device. Such terminals can be used as a client device or a game client device as disclosed herein.

A server, as used herein, may refer to one or more server computers configured to provide certain server functionalities, such as database management and search engines. A server may also include one or more processors to execute computer programs in parallel. In one embodiment, the server can be used as a game server as desired.

Figure 9:
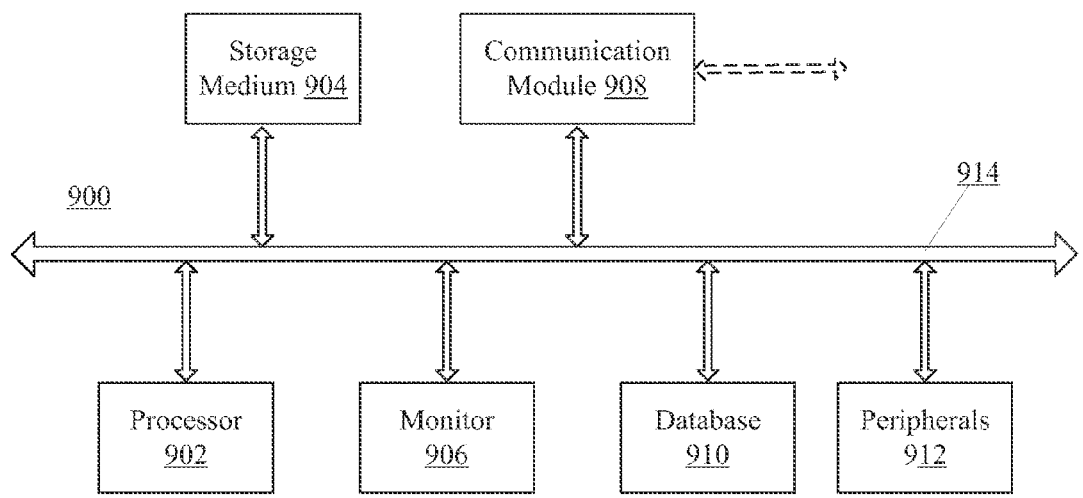
FIG. 9 depicts a block diagram of an exemplary computer system in accordance with various disclosed embodiments.

Server 804 and/or client 806 may be implemented on any appropriate computing platform. FIG. 9 shows a block diagram of an exemplary computing system 900 capable of implementing server 804 and/or client 806.

As shown in FIG. 9, computing system 900 may include a processor 902, a storage medium 904, a monitor 906, a communication module 908, a database 910, and/or peripherals 912. Certain devices may be omitted and other devices may be included.

Processor 902 may include any appropriate processor or processors. Further, processor 902 can include multiple cores for multi-thread or parallel processing. Storage medium 904 may include memory modules, such as ROM, RAM, flash memory modules, and erasable and rewritable memory, and mass storages, such as CD-ROM, U-disk, and hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network 902. Database 910 may include one or more databases for storing certain data and for performing certain operations on the stored data, such as database searching.

Figure 1:
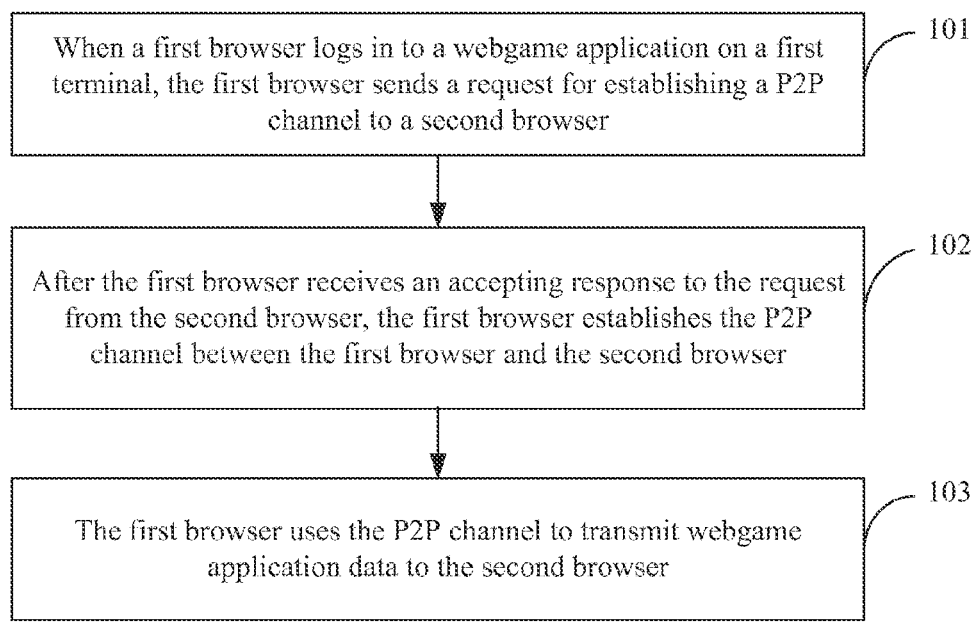
FIG. 1 is a flow chart of an exemplary method for a webgame interaction in accordance with various embodiments.

Referring to FIG. 1, an exemplary webgame interaction method is provided. The exemplary webgame interaction method can be used for a first terminal. The first terminal uses a first browser to access a webgame application, and performs the webgame interaction with a second terminal using a second browser to access the webgame application.

In Step 101, when the first browser logs in to the webgame application on the first terminal, the first browser sends a request for establishing a P2P channel to the second browser.

In Step 102, after the first browser receives an accepting response to the request for establishing the P2P channel from the second browser, the first browser establishes the P2P channel between the first browser and the second browser.

In Step 103, the first browser uses the P2P channel to transmit webgame application data to the second browser.

In one embodiment, the first terminal or the second terminal can be a computer, a laptop, a mobile phone, a tablet PC, and/or other suitable electronic devices, without limitation.

The webgame application can include a web-based game, and users of the first terminal or the second terminal can login to a corresponding webpage via a browser to enter the webgame. For example, a user can input an URL (uniform resource locator) in an address bar of the browser to enter the webgame. Generally, the webgame can be a game interacted by multiple people/parties. For example, a user of a first terminal and a user of a second terminal can respectively login to a webgame to perform a game interaction.

In one embodiment, when the first browser logs in the webgame application on the first terminal, the first browser can send the request for establishing the P2P channel to the second browser. For example, the first browser can provide an interface for establishing the P2P channel. When the first browser receives a request for calling the interface from the webgame application, the request for establishing the P2P channel can be sent to the second browser.

For example, the interface provided by the first browser can include an API (i.e., application programming interface), and the API can function that a browser can request to establish a P2P channel with another browser. When the user of the first terminal logs in the webgame via the first browser, the webgame can call the API provided by the first browser to initiate the procedure for establishing the P2P channel.

In another embodiment, when the first browser receives a refusing response to the request for establishing the P2P channel from the second browser, the webgame application server can be used to transmit the webgame application data between the first browser and the second browser.

In the disclosed webgame interaction method by a first terminal, the first terminal sends a request for establishing a P2P channel to a second browser, when the first browser logs in to a webgame application on the first terminal. The first terminal uses the first browser to access the webgame application, and the first terminal performs the webgame interaction with a second terminal using the second browser to access the webgame application. The P2P channel is established between the first browser and the second browser, after the first browser receives an accepting response to the request for establishing the P2P channel from the second browser. The first browser uses the P2P channel to transmit webgame application data between the first browser and the second browser. In this manner, browsers for logging in webgames can be directly connected, and users can have p2p game interaction without using servers to transit. Cost for the servers can be reduced. Webgames can thus use browsers to share resources and to perform p2p transmission.

Figure 2:
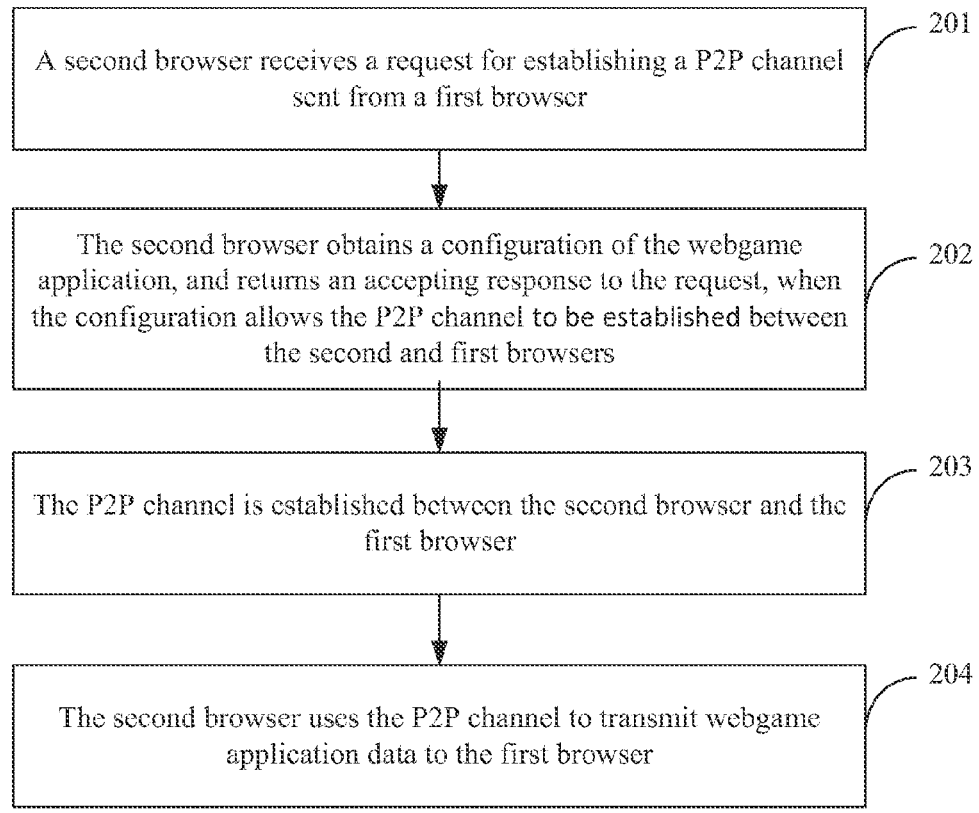
FIG. 2 is a flow chart of another exemplary method for a webgame interaction in accordance with various embodiments.

Referring to FIG. 2, another exemplary webgame interaction method is provided. The exemplary webgame interaction method can be used for a second terminal. The second terminal uses a second browser to access a webgame application, and performs the webgame interaction with a first terminal using a first browser to access the webgame application.

In Step 201, the second browser receives a request for establishing a P2P channel sent from the first browser.

In Step 202, the second browser obtains a configuration of the webgame application, and returns an accepting response to the request for establishing the P2P channel to the first browser, when the configuration allows the P2P channel to be established between the second browser and the first browser.

In Step 203, the P2P channel is established between the second browser and the first browser. In Step 204, the second browser uses the P2P channel to transmit webgame application data to the first browser.

In one embodiment, the first terminal or the second terminal can be a computer, a laptop, a mobile phone, a tablet PC, and/or other suitable electronic devices, without limitation.

The webgame application can include a web-based game, and users of the first terminal or the second terminal can login to a corresponding webpage via a browser to enter the webgame. For example, a user can input an URL (uniform resource locator) in an address bar of the browser to enter the webgame. Generally, the webgame can be a game interacted by multiple people/parties. For example, a user of a first terminal and a user of a second terminal can respectively login to a webgame to perform a game interaction.

In one embodiment, the configuration of the webgame application can include a default configuration of the webgame application, and/or a configuration modified by a user of the second terminal. The configuration of the webgame application can include: allowing the second browser to establish the P2P channel with a requester, and/or prohibiting the second browser to establish the P2P channel with the requester.

Generally, one webgame has one default configuration. When the webgame is suitable for multiple-user interactions, by default, the P2P channel can be allowed to be established with the requester. When the webgame is not suitable for multiple-user interactions, by default, the P2P channel is prohibited to be established with the requester.

In another embodiment, when the configuration prohibits the P2P channel to be established between the second browser and the first browser, a refusing response can be returned to the request for establishing the P2P channel to the first browser.

In some embodiments, the second browser can use the webgame application server to transmit the webgame application data to the first browser.

In the disclosed webgame interaction method by a second terminal, the second browser receives a request for establishing a P2P channel sent from a first browser. The second terminal uses the second browser to access a webgame application, and the second terminal performs the webgame interaction with a first terminal using the first browser to access the webgame application. The second browser obtains a configuration of the webgame application and returns an accepting response to the request for establishing the P2P channel to the first browser, when the configuration allows the P2P channel to be established between the second browser and the first browser. The P2P channel is established between the second browser and the first browser. The second browser uses the P2P channel to transmit webgame application data to the first browser. In this manner, browsers for logging in webgames can be directly connected, and users can have p2p game interaction without using servers to transit. Cost for the servers can be reduced. Webgames can thus use browsers to share resources and to perform p2p transmission.

Figure 3:
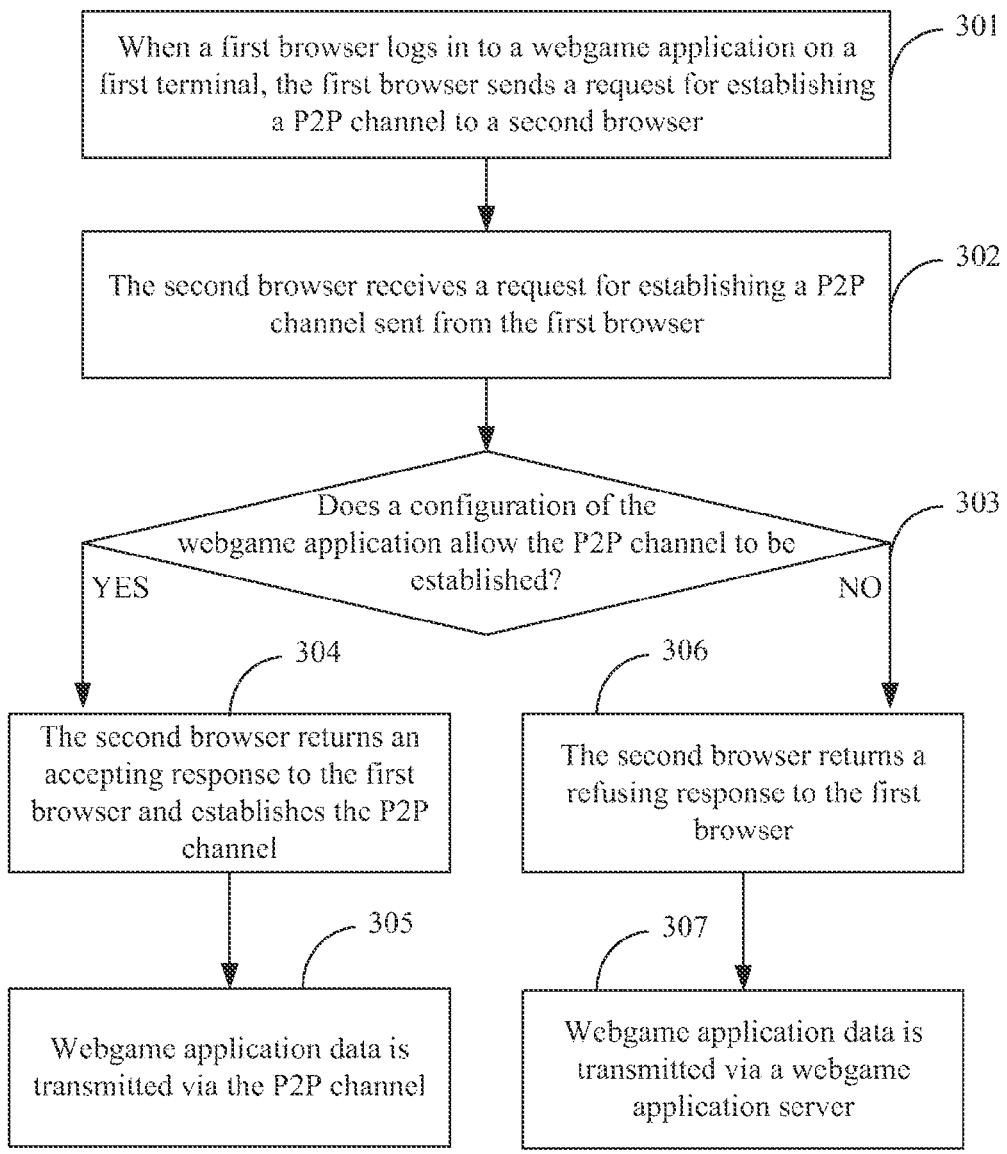
FIG. 3 is a flow chart of another exemplary method for a webgame interaction in accordance with various embodiments.

Referring to FIG. 3, another exemplary webgame interaction method is provided. The exemplary webgame interaction method can be used for a first terminal and a second terminal. The first terminal uses a first browser to access a webgame application, and performs the webgame interaction with a second terminal using a second browser to access the webgame application.

In Step 301, when the first browser logs in to the webgame application on the first terminal, the first browser sends a request for establishing a P2P channel to the second browser.

For example, the first browser can provide an interface for establishing the P2P channel. When the first browser receives a request for calling the interface from the webgame application, the first browser sends the request for establishing the P2P channel to the second browser.

In Step 302, the second browser receives a request for establishing a P2P channel sent from the first browser.

In Step 303, the second browser obtains a configuration of the webgame application. When the configuration allows the P2P channel to be established between the second browser and the first browser, Step 304 is performed. When the configuration prohibits the P2P channel to be established between the second browser and the first browser, Step 306 is performed.

In Step 304, an accepting response to the request for establishing the P2P channel is returned to the first browser. The P2P channel can be established between the first browser and the second browser.

In Step 305, the webgame application data is transmitted via the P2P channel between the first browser and the second browser. In some cases, the webgame interaction method is then completed.

In Step 306, the refusing response to the request for establishing the P2P channel is returned to the first browser.

In Step 307, the webgame application data is transmitted via the webgame application server between the first browser and the second browser to complete the process.

In one embodiment, the first terminal or the second terminal can be a computer, a laptop, a mobile phone, a tablet PC, and/or other suitable electronic devices, without limitation.

The webgame application can include a web-based game, and users of the first terminal or the second terminal can login to a corresponding webpage via a browser to enter the webgame. For example, a user can input an URL (uniform resource locator) in an address bar of the browser to enter the webgame. Generally, the webgame can be a game interacted by multiple people/parties. For example, a user of a first terminal and a user of a second terminal can respectively login to a webgame to perform a game interaction.

In one embodiment, the configuration of the webgame application can include a default configuration of the webgame application, and/or a configuration modified by a user of the second terminal. The configuration of the webgame application can include: allowing the second browser to establish the P2P channel with a requester, and/or prohibiting the second browser to establish the P2P channel with the requester.

Generally, one webgame has one default configuration. When the webgame is suitable for multiple-user interactions, by default, the P2P channel can be allowed to be established with the requester. When the webgame is not suitable for multiple-user interactions, by default, the P2P channel is prohibited to be established with the requester.

Figure 4:
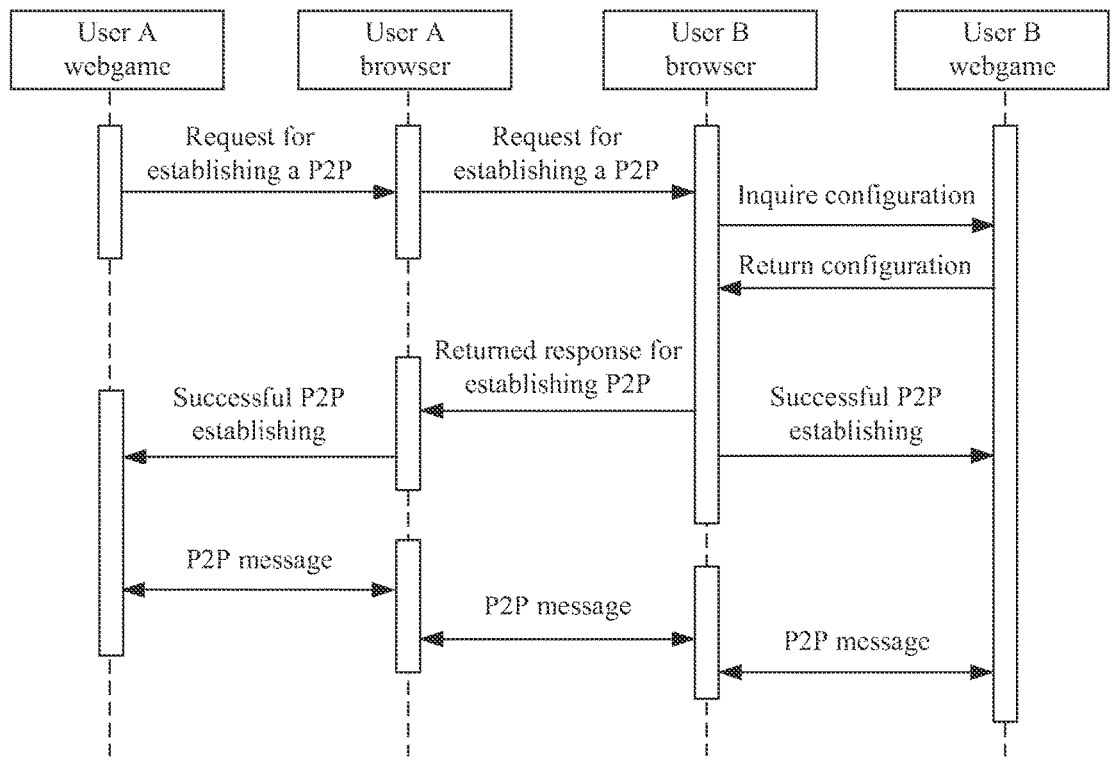
FIG. 4 is a schematic of webgame interaction as depicted in FIG. 3 in accordance with various embodiments.

Referring to FIG. 4, a webgame interaction process can be described as an example. User A of the first terminal logs in a webgame via a browser, and user B of a second terminal logs in a same webgame via a browser to perform a game interaction.

For example, the webgame of the user A sends a request for establishing a P2P channel to the browser of user A. The browser of user A forwards the request to the browser of user B. The browser of user B inquires the webgame of user B about webgame configuration. The webgame of user B returns the webgame configuration to the browser of user B.

According to the webgame configuration, when the browser of user B determines to allow the P2P channel to be established, the P2P channel between the browser of user A and the browser of user B can be established. A message that the P2P channel is successfully established is returns respectively to the webgame of user A and the webgame of user B. Then, the webgame of user A can perform P2P message interaction with the webgame of user B via the established P2P channel to transmit webgame related data and to perform the game interaction.

In the disclosed webgame interaction method by a first terminal, the first terminal sends a request for establishing a P2P channel to a second browser, when the first browser logs in to a webgame application on the first terminal. The first terminal uses the first browser to access the webgame application, and the first terminal performs the webgame interaction with a second terminal using the second browser to access the webgame application. The P2P channel is established between the first browser and the second browser, after the first browser receives an accepting response to the request for establishing the P2P channel from the second browser. The first browser uses the P2P channel to transmit webgame application data between the first browser and the second browser. In this manner, browsers for logging in webgames can be directly connected, and users can have p2p game interaction without using servers to transit. Cost for the servers can be reduced. Webgames can thus use browsers to share resources and to perform p2p transmission.

Figure 5:
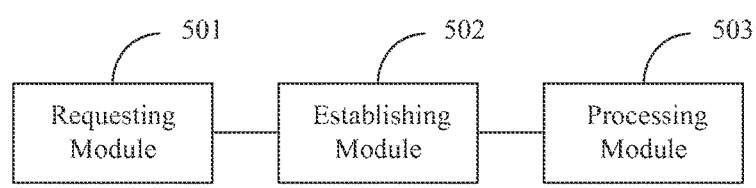
FIG. 5 is a structural schematic of a first browser in accordance with various embodiments.

Referring to FIG. 5, an exemplary browser for a webgame interaction is provided. The exemplary browser can be a first browser on a first terminal. The first terminal uses the first browser to access a webgame application, and performs the webgame interaction with a second terminal using a second browser to access the webgame application.

The exemplary first browser can include: a requesting module 501, an establishing module 502, and/or a processing module 503.

The requesting module 501 is configured to send a request for establishing a P2P channel to the second browser, when the first browser logs in to the webgame application; and to receive an accepting response to the request for establishing the P2P channel from the second browser.

The establishing module 502 is configured, after the requesting module 501 receives the accepting response to the request for establishing the P2P channel, to establish the P2P channel between the first browser and the second browser.

The processing module 503 is configured to use the P2P channel to transmit webgame application data with the second browser.

In one embodiment, the first terminal or the second terminal can be a computer, a laptop, a mobile phone, a tablet PC, and/or other suitable electronic devices, without limitation.

The webgame application can include a web-based game, and users of the first terminal or the second terminal can login to a corresponding webpage via a browser to enter the webgame. For example, a user can input an URL (uniform resource locator) in an address bar of the browser to enter the webgame. Generally, the webgame can be a game interacted by multiple people/parties. For example, a user of a first terminal and a user of a second terminal can respectively login to a webgame to perform a game interaction.

In some embodiment, the requesting module 501 is further configured to provide an interface for establishing the P2P channel and to send the request for establishing the P2P channel to the second browser, when receiving a request for calling the interface from the webgame application.

In other embodiments, the requesting module 501 is further configured to receive a refusing response to the request for establishing the P2P channel from the second browser.

The processing module 503 is further configured, when the requesting module receives a refusing response to the request for establishing the P2P channel from the second browser, to use the webgame application server to transmit the webgame application data to the second browser.

The exemplary first browser provided in FIG. 5 can implement any methods as described herein. Repeated description in accordance with these methods is therefore omitted.

In the disclosed first browser for a webgame interaction, the first terminal sends a request for establishing a P2P channel to a second browser, when the first browser logs in to a webgame application on the first terminal. The first terminal uses the first browser to access the webgame application, and the first terminal performs the webgame interaction with a second terminal using the second browser to access the webgame application. The P2P channel is established between the first browser and the second browser, after the first browser receives an accepting response to the request for establishing the P2P channel from the second browser. The first browser uses the P2P channel to transmit webgame application data between the first browser and the second browser. In this manner, browsers for logging in webgames can be directly connected, and users can have p2p game interaction without using servers to transit. Cost for the servers can be reduced. Webgames can thus use browsers to share resources and to perform p2p transmission.

Figure 6:
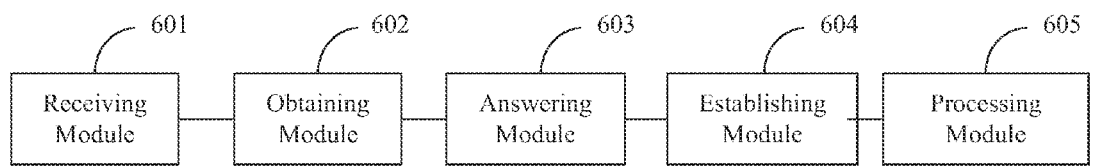
FIG. 6 is a structural schematic of a second browser in accordance with various embodiments.

Referring to FIG. 6, an exemplary browser for a webgame interaction is provided. The exemplary browser can be a second browser installed on a second terminal. The second terminal uses the second browser to access a webgame application, and performs the webgame interaction with a first terminal using a first browser to access the webgame application.

The exemplary second browser can include: a requesting module 601, an obtaining module 602, a responding module 603, an establishing module 604, and/or a processing module 605.

The receiving module 601 is configured to receive a request for establishing a P2P channel sent from the first browser.

The obtaining module 602 is configured to obtain a configuration of the webgame application.

The responding module 603 is configured, when the configuration allows the P2P channel to be established between the second browser and the first browser, to return an accepting response to the request for establishing the P2P channel to the first browser.

The establishing module 604 is configured to establish the P2P channel between the second browser and the first browser, when the configuration allows the P2P channel to be established between the second browser and the first browser.

The processing module 605 is configured to use the P2P channel to transmit webgame application data to the first browser.

In one embodiment, the first terminal or the second terminal can be a computer, a laptop, a mobile phone, a tablet PC, and/or other suitable electronic devices, without limitation.

The webgame application can include a web-based game, and users of the first terminal or the second terminal can login to a corresponding webpage via a browser to enter the webgame. For example, a user can input an URL (uniform resource locator) in an address bar of the browser to enter the webgame. Generally, the webgame can be a game interacted by multiple people/parties. For example, a user of a first terminal and a user of a second terminal can respectively login to a webgame to perform a game interaction.

In one embodiment, the configuration of the webgame application can include a default configuration of the webgame application, and/or a configuration modified by a user of the second terminal. The configuration of the webgame application can include: allowing the second browser to establish the P2P channel with a requester, and/or prohibiting the second browser to establish the P2P channel with the requester.

In some embodiments, the responding module 603 is further configured, when the configuration prohibits the P2P channel to be established between the second browser and the first browser, to return a refusing response to the request for establishing the P2P channel to the first browser.

The processing module 605 is further configured, when the configuration prohibits the P2P channel to be established between the second browser and the first browser, to use the webgame application server to transmit the webgame application data to the first browser.

The exemplary second browser provided in FIG. 6 can implement any methods as described herein. Repeated description in accordance with these methods is therefore omitted.

In the disclosed second browser for a webgame interaction method, the second browser receives a request for establishing a P2P channel sent from a first browser. The second terminal uses the second browser to access a webgame application, and the second terminal performs the webgame interaction with a first terminal using the first browser to access the webgame application. The second browser obtains a configuration of the webgame application and returns an accepting response to the request for establishing the P2P channel to the first browser, when the configuration allows the P2P channel to be established between the second browser and the first browser. The P2P channel is established between the second browser and the first browser. The second browser uses the P2P channel to transmit webgame application data to the first browser. In this manner, browsers for logging in webgames can be directly connected, and users can have p2p game interaction without using servers to transit. Cost for the servers can be reduced. Webgames can thus use browsers to share resources and to perform p2p transmission.

Various embodiments also provide an exemplary first terminal for a webgame interaction. The exemplary first terminal can include the first terminal as depicted above, e.g., as in FIG. 5. The exemplary first browser can include the first browser as depicted above, e.g., as in FIG. 5. The exemplary first terminal and/or first browser can be used to implement methods described in this disclosure.

In the disclosed first terminal for a webgame interaction, the first terminal sends a request for establishing a P2P channel to a second browser, when the first browser logs in to a webgame application on the first terminal. The first terminal uses the first browser to access the webgame application, and the first terminal performs the webgame interaction with a second terminal using the second browser to access the webgame application. The P2P channel is established between the first browser and the second browser, after the first browser receives an accepting response to the request for establishing the P2P channel from the second browser. The first browser uses the P2P channel to transmit webgame application data between the first browser and the second browser. In this manner, browsers for logging in webgames can be directly connected, and users can have p2p game interaction without using servers to transit. Cost for the servers can be reduced. Webgames can thus use browsers to share resources and to perform p2p transmission.

Various embodiments also provide an exemplary second terminal for a webgame interaction. The exemplary second terminal can include the second terminal as depicted above, e.g., as in FIG. 6. The exemplary second browser can include the second browser as depicted above, e.g., as in FIG. 6. The exemplary second terminal and/or second browser can be used to implement methods described in this disclosure.

In the disclosed second terminal for a webgame interaction method, the second browser receives a request for establishing a P2P channel sent from a first browser. The second terminal uses the second browser to access a webgame application, and the second terminal performs the webgame interaction with a first terminal using the first browser to access the webgame application. The second browser obtains a configuration of the webgame application and returns an accepting response to the request for establishing the P2P channel to the first browser, when the configuration allows the P2P channel to be established between the second browser and the first browser. The P2P channel is established between the second browser and the first browser. The second browser uses the P2P channel to transmit webgame application data to the first browser. In this manner, browsers for logging in webgames can be directly connected, and users can have p2p game interaction without using servers to transit. Cost for the servers can be reduced. Webgames can thus use browsers to share resources and to perform p2p transmission.

Figure 7:
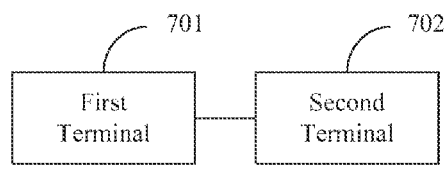
FIG. 7 depicts an exemplary system for a webgame interaction in accordance with various embodiments.

Referring to FIG. 7, an exemplary webgame interaction system is provided. The exemplary webgame interaction system can include a first terminal 701 including, e.g., the first terminal in FIG. 5, and a second terminal 702 including, e.g., the second terminal in FIG. 6.

The first terminal 701 can be the same or different from the first terminal as depicted in FIG. 5. The second terminal 702 can be the same or different from the second terminal as depicted in FIG. 6. The provided system can implement any methods as described above in this disclosure. Repeated, detailed description is therefore omitted.

In the disclosed system for a webgame interaction, the first terminal sends a request for establishing a P2P channel to a second browser, when the first browser logs in to a webgame application on the first terminal. The first terminal uses the first browser to access the webgame application, and the first terminal performs the webgame interaction with a second terminal using the second browser to access the webgame application. The P2P channel is established between the first browser and the second browser, after the first browser receives an accepting response to the request for establishing the P2P channel from the second browser. The first browser uses the P2P channel to transmit webgame application data between the first browser and the second browser. In this manner, browsers for logging in webgames can be directly connected, and users can have p2p game interaction without using servers to transit. Cost for the servers can be reduced. Webgames can thus use browsers to share resources and to perform p2p transmission.

In various embodiments, the first browser and/or the second browser can be installed in one or both of the first terminal and the second terminal. The first browser, the second browser, the first terminal, and/or the second terminal can be configured in a same or different system for webgame interactions.

Various embodiments also provide a computer storage medium. The computer storage medium may store a program. Execution of the program includes some or all of the steps of the exemplary methods for testing game data as disclosed herein.

The modules and/or units included herein are described according to their functional logic, but are not limited to the above descriptions as long as the modules/units can implement corresponding functions. Further, the specific name of each functional unit is used for distinguishing from on another without limiting the protection scope of the present disclosure. In various embodiments, the disclosed modules/units can be configured in one apparatus or configured in multiple apparatus as desired. The modules/units disclosed herein can be integrated in one module/unit/apparatus or in multiple modules/units/apparatus. Each of the modules/units/ disclosed herein can be divided into one or more sub-modules/units/, which can be recombined in any manner.

Note that suitable software and/or hardware (e.g., a universal hardware platform) may be included and used in the disclosed methods and apparatus. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

The term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a " does not exclude other elements included in the process, method, article, or apparatus having those elements.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The embodiments disclosed herein are exemplary only. The order by which the foregoing examples of the present disclosure are presented merely reflects the convenience of description. It does not imply the preference among the examples. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, apparatus and systems for a webgame interaction are provided. In the disclosed webgame interaction methods, apparatus, and systems, the first terminal sends a request for establishing a P2P channel to a second browser, when the first browser logs in to a webgame application on the first terminal. The first terminal uses the first browser to access the webgame application, and the first terminal performs the webgame interaction with a second terminal using the second browser to access the webgame application. The P2P channel is established between the first browser and the second browser, after the first browser receives an accepting response to the request for establishing the P2P channel from the second browser. The first browser uses the P2P channel to transmit webgame application data between the first browser and the second browser. In this manner, browsers for logging in webgames can be directly connected, and users can have p2p game interaction without using servers to transit. Cost for the servers can be reduced. Webgames can thus use browsers to share resources and to perform p2p transmission.

In the disclosed webgame interaction methods, apparatus, and systems, the second browser receives a request for establishing a P2P channel sent from a first browser. The second terminal uses the second browser to access a webgame application, and the second terminal performs the webgame interaction with a first terminal using the first browser to access the webgame application. The second browser obtains a configuration of the webgame application and returns an accepting response to the request for establishing the P2P channel to the first browser, when the configuration allows the P2P channel to be established between the second browser and the first browser. The P2P channel is established between the second browser and the first browser. The second browser uses the P2P channel to transmit webgame application data to the first browser. In this manner, browsers for logging in webgames can be directly connected, and users can have p2p game interaction without using servers to transit. Cost for the servers can be reduced. Webgames can thus use browsers to share resources and to perform p2p transmission.

What is claimed is:

1. A webgame interaction method, comprising:
automatically sending, by a first browser on a first terminal, a request for establishing a P2P channel to a second browser when the first browser logs in to a webgame application on the first terminal through a webgame application server and the second browser is logged in to the webgame application on a second terminal through the webgame application server, wherein the first terminal, the second terminal, and the webgame application server respectively include at least a processer and a communication means, the first terminal uses the first browser to access the webgame application, and the first terminal performs the webgame interaction with the second terminal;
when the first browser receives a refusing response to the request for establishing the P2P channel automatically sent from the second browser, using the webgame application server, by the first browser on the first terminal, to forward the webgame application data between the first browser and the second browser;
when the first browser receives an accepting response to the request for establishing the P2P channel automatically sent from the second browser, establishing the P2P channel between the first browser and the second browser; and
using the P2P channel, by the first browser on the first terminal, to transmit webgame application data directly between the first browser and the second browser.

2. The method according to claim 1, wherein sending the request for establishing the P2P channel to the second browser comprises:
providing, by the first browser, an interface for establishing the P2P channel;
when the first browser logs in to a webgame application on the first terminal and the second browser is logged in to the webgame application on the second terminal, automatically sending, by the webgame application, a request for calling the interface for establishing the P2P channel; and in response to the request from the webgame application, automatically sending, by the first browser, the request for establishing the P2P channel to the second browser.

3. The method according to claim 1, further comprising:
receiving, by the second browser, the request for establishing the P2P channel sent from the first browser, wherein the second terminal uses the second browser to access the webgame application, and the second terminal performs the webgame interaction with the first terminal using the first browser to access the webgame application;
obtaining, by the second browser, a configuration of the webgame application;
returning, by the second browser, an accepting response to the request for establishing the P2P channel to the first browser when the configuration allows the P2P channel to be established between the second browser and the first browser;
establishing the P2P channel between the second browser and the first browser; and
using, by the second browser, the P2P channel to directly transmit webgame application data to the first browser.

4. The method according to claim 3, wherein the configuration of the webgame application is a default configuration of the webgame application, or a configuration modified by a user of the second terminal, and
wherein the configuration of the webgame application comprises: allowing the second browser to establish the P2P channel with a requester, or prohibiting the second browser to establish the P2P channel with the requester.

5. The method according to claim 3, further comprising:
returning a refusing response to the request for establishing the P2P channel to the first browser when the configuration prohibits the P2P channel to be established between the second browser and the first browser; and
using, by the second browser, the webgame application server to transmit the webgame application data to the first browser.

6. A system for a webgame interaction comprising a first browser installed on a first terminal comprising at least a first processor and a first communication means, the first browser comprising a plurality of first program modules to be executed by the first processor, the plurality of first program modules comprising:
a requesting module, configured to automatically send a request for establishing a P2P channel to a second browser when the first browser logs in to a webgame application through a webgame application server and the second browser is logged in to the webgame application on a second terminal through the webgame application server; and to receive an accepting response to the request for establishing the P2P channel automatically sent from the second browser or to receive a refusing response to the request for establishing the P2P channel automatically sent from the second browser,
wherein the first terminal uses the first browser to access the webgame application, and the first terminal performs the webgame interaction with the second terminal;
an establishing module configured, after the requesting module receives the accepting response to the request for establishing the P2P channel, to establish the P2P channel between the first browser and the second browser; and a processing module, configured, when the P2P channel between the first browser and the second browser is established, to use the P2P channel to transmit webgame application data with the second browser; and when the request module receives a refusing response to the request for establishing the P2P channel from the second browser, to use the webgame application server to forward the webgame application data between the first browser and the second browser.

7. The system according to claim 6, wherein the requesting module is configured to provide an interface for establishing the P2P channel and to send the request for establishing the P2P channel to the second browser when receiving a request for calling the interface from the webgame application, wherein the request for calling the interface is automatically sent by the webpage application when the first browser logs in to a webgame application on the first terminal and the second browser is logged in to the webgame application on the second terminal.

8. The system according to claim 6, further comprising the second browser installed on a second terminal comprising at least a second processor and a second communication means, and the second browser comprising a plurality of second program modules to be executed by the second processor, the plurality of second program modules comprising:
  a receiving module, configured to receive the request for establishing the P2P channel sent from the first browser, wherein the second terminal uses the second browser to access the webgame application, and the second terminal performs the webgame interaction with the first terminal using the first browser to access the webgame application;
  an obtaining module, configured to obtain a configuration of the webgame application;
  a responding module configured, when the configuration allows the P2P channel to be established between the second browser and the first browser, to return an accepting response to the request for establishing the P2P channel to the first browser;
  an establishing module, configured to establish the P2P channel between the second browser and the first browser when the configuration allows the P2P channel to be established between the second browser and the first browser; and
  a processing module, configured to use the P2P channel to transmit webgame application data to the first browser.

9. The system according to claim 8, wherein the configuration of the webgame application is a default configuration of the webgame application, or a configuration modified by a user of the second terminal, and
  wherein the configuration of the webgame application comprises: allowing the second browser to establish the P2P channel with a requester, or prohibiting the second browser to establish the P2P channel with the requester.

10. The system according to claim 8, wherein
  the responding module is further configured, when the configuration prohibits to establish the P2P channel between the second browser and the first browser, to return a refusing response to the request for establishing the P2P channel to the first browser; and
  the processing module is further configured, when the configuration prohibits establishing the P2P channel between the second browser and the first browser, to use the webgame application server to transmit the webgame application data to the first browser.

11. A browser for terminals provided for the webgame interaction, the browser being installed on a first terminal comprising at least a first processor and a first communication means, and comprising a plurality of first program modules to be executed by the first processor, the plurality of first program modules comprising:
  a requesting module, configured to automatically send a request for establishing a P2P channel to a second browser when the browser logs in to a webgame application through a webgame application server and the second browser is logged in to the webgame application on a second terminal through the webgame application server; and to receive an accepting response to the request for establishing the P2P channel automatically sent from the second browser or to receive a refusing response to the request for establishing the P2P channel automatically sent from the second browser,
  wherein the first terminal uses the browser to access the webgame application, and the first terminal performs the webgame interaction with the second terminal;
  an establishing module configured, after the requesting module receives the accepting response to the request for establishing the P2P channel, to establish the P2P channel between the browser and the second browser; and
  a processing module, configured, when the P2P channel between the browser and the second browser is established, to use the P2P channel to transmit webgame application data with the second browser; and when the request module receives a refusing response to the request for establishing the P2P channel from the second browser, to use the webgame application server to forward the webgame application data between the browser and the second browser.

12. The browser according to claim 11, wherein the requesting module is configured to provide an interface for establishing the P2P channel and to send the request for establishing the P2P channel to the second browser when receiving a request for calling the interface from the webgame application, wherein the request for calling the interface is automatically sent by the webpage application when the browser logs in to a webgame application on the first terminal and the second browser is logged in to the webgame application on the second terminal.

13. The browser according to claim 11, the second browser being installed on a second terminal comprising at least a second processor and a second communication means and comprising a plurality of second program modules to be executed by the second processor, the plurality of second program modules comprising:
  a receiving module, configured to receive the request for establishing the P2P channel sent from the browser, wherein the second terminal uses the second browser to access the webgame application, and the second terminal performs the webgame interaction with the first terminal using the browser to access the webgame application;
  an obtaining module, configured to obtain a configuration of the webgame application;
  a responding module configured, when the configuration allows the P2P channel to be established between the second browser and the browser, to return an accepting response to the request for establishing the P2P channel to the browser;
  an establishing module, configured to establish the P2P channel between the second browser and the browser when the configuration allows the P2P channel to be established between the second browser and the browser; and a processing module, configured to use the P2P channel to transmit webgame application data to the browser.

14. The webgame interaction method according to claim 1, wherein:

the second browser is configured to automatically accept the request for establishing the P2P channel in a default setting when the webgame application is a game involving multi-user interactions, and to automatically refuse the request for establishing the P2P channel in the default setting when the webgame application is a game without multi-user interactions.

* * * * *